United States Patent [19]
Eppig et al.

[11] Patent Number: 5,092,983
[45] Date of Patent: Mar. 3, 1992

[54] PROCESS FOR SEPARATING EXTRACTABLE ORGANIC MATERIAL FROM COMPOSITIONS COMPRISING SAID EXTRACTABLE ORGANIC MATERIAL INTERMIXED WITH SOLIDS AND WATER USING A SOLVENT MIXTURE

[75] Inventors: Christopher Eppig, Cleveland Heights; Stephen C. Paspek, Broadview Heights, both of Ohio

[73] Assignee: The Standard Oil Company, Cleveland, Ohio

[21] Appl. No.: 444,110

[22] Filed: Nov. 30, 1989

Related U.S. Application Data

[63] Continuation-in-part of Ser. No. 320,865, Mar. 7, 1989, Pat. No. 4,885,079, which is a continuation of Ser. No. 907,727, Sep. 12, 1986, abandoned, and a continuation-in-part of Ser. No. 278,967, Dec. 2, 1988, Pat. No. 4,981,579.

[51] Int. Cl.$^5$ .................... C10G 21/02; C10G 21/14; C10G 21/18
[52] U.S. Cl. .................. 208/323; 208/13; 208/317; 208/336; 208/337
[58] Field of Search ............... 208/323, 13, 317, 336, 208/337

[56] References Cited

U.S. PATENT DOCUMENTS

| | | | |
|---|---|---|---|
| Re. 31,913 | 6/1985 | Berger | 422/267 |
| 2,037,218 | 4/1936 | Empson | 210/48 |
| 2,235,639 | 3/1941 | Koch | 196/5 |
| 2,272,372 | 2/1942 | Hixson et al. | 196/13 |
| 2,330,054 | 9/1943 | Hibshman | 196/13 |
| 2,383,362 | 8/1945 | Batchelder | 196/5 |
| 2,383,363 | 8/1945 | Batchelder | 196/4 |
| 2,454,653 | 11/1948 | Kamp | 210/55 |
| 2,886,523 | 5/1959 | Claridge et al. | 208/312 |
| 2,964,465 | 12/1960 | Brown et al. | 208/314 |
| 3,184,401 | 5/1965 | Gorin | 208/8 |
| 3,202,605 | 8/1965 | Redcay | 208/337 |
| 3,249,532 | 5/1966 | Chyn Doug Shiah | 208/323 |
| 3,415,741 | 12/1968 | Karl-Heinz Eisenlohr et al. | 208/323 |
| 3,417,014 | 12/1968 | Lumpkin | 208/187 |
| 3,441,499 | 4/1969 | Francis, Jr. et al. | 208/187 |
| 3,492,365 | 1/1970 | Anderson et al. | 260/674 |
| 3,506,564 | 4/1970 | Cone | 208/33 |
| 3,600,302 | 8/1971 | Hong | 208/323 |
| 3,696,021 | 10/1972 | Cole et al. | 208/13 |

(List continued on next page.)

FOREIGN PATENT DOCUMENTS

| | | | |
|---|---|---|---|
| 0260064 | 3/1988 | European Pat. Off. | 208/323 |
| 0298610 | 1/1989 | European Pat. Off. | 208/311 |
| 3345563A1 | 7/1985 | Fed. Rep. of Germany | 208/106 |
| 3404133A1 | 8/1985 | Fed. Rep. of Germany | 208/179 |
| 1364942 | 8/1974 | United Kingdom | 208/311 |
| 1373023 | 11/1974 | United Kingdom | 208/337 |
| 2033244 | 5/1980 | United Kingdom | . |
| 2001670B | 5/1982 | United Kingdom | 208/337 |

OTHER PUBLICATIONS

Shell Oil Company Letter of Jan. 8, 1990 to EPA RCRA Docket (OS-305), "Comments on RCRA Proposed Rules—L and Disposal Restrictions for Third Scheduled Wastes—Federal Register Nov. 22, 1989, p. 48372".

(List continued on next page.)

*Primary Examiner*—Anthony McFarlane
*Attorney, Agent, or Firm*—Larry W. Evans; Teresan W. Gilbert

[57] ABSTRACT

This invention provides for a process for separating extractable organic material from a feed composition comprising said extractable organic material intermixed with solids and water, the process comprising:
(A) contacting said feed composition with a solvent mixture in an enclosed space, said solvent mixture comprising at least one first organic solvent and at least one second organic solvent, said first organic solvent being capable of dissolving at least about ten parts of said extractable organic material per million parts of said first organic solvent at the temperature wherein at least about 50% by weight of said first organic solvent boils at atmospheric pressure, said second organic solvent being different than and more volatile than said first organic solvent and being capable of dissolving at least about ten parts of said first organic solvent per million parts of said second organic solvent at the temperature wherein at least about 50% by weight of said second organic solvent boils at atmospheric pressure;
(B) dissolving at least part of said extractable organic material in said solvent mixture to form a solvent-extract mixture; and
(C) separating at least part of said solvent-extract mixture from the contents of said enclosed space, the remaining contents in said enclosed space comprising a treated product.

61 Claims, 4 Drawing Sheets

| | | | |
|---|---|---|---|
| 3,711,400 | 1/1973 | Cole et al. | 210/21 |
| 3,725,254 | 4/1973 | Chung Wang | 208/314 |
| 3,761,402 | 9/1973 | Atwood | 208/314 |
| 3,764,008 | 10/1973 | Darley et al. | 210/73 |
| 3,789,077 | 1/1974 | Kosseim et al. | 260/674 SE |
| 3,867,275 | 2/1975 | Gleim et al. | 208/8 |
| 3,883,420 | 5/1975 | Stone | 208/321 |
| 3,917,564 | 11/1975 | Meyers | 208/131 |
| 3,997,425 | 12/1976 | Gatsis et al. | 208/8 |
| 4,017,383 | 4/1977 | Beavon | 208/309 |
| 4,025,424 | 5/1977 | Reichhardt et al. | 210/23 R |
| 4,035,281 | 7/1977 | Espenscheid et al. | 208/8 |
| 4,040,958 | 8/1977 | Rammler | 210/73 R |
| 4,073,719 | 2/1978 | Whisman et al. | 208/180 |
| 4,075,080 | 2/1978 | Gorin | 208/8 |
| 4,079,004 | 3/1978 | Ian et al. | 210/52 |
| 4,081,360 | 3/1978 | Ian et al. | 208/8 |
| 4,094,781 | 6/1978 | Snell et al. | 210/54 |
| 4,108,681 | 8/1978 | Lawson et al. | 208/326 |
| 4,124,486 | 11/1978 | Nalley | 208/95 |
| 4,211,638 | 7/1980 | Akell et al. | 208/180 |
| 4,224,136 | 9/1980 | zu Köcker et al. | 208/8 LE |
| 4,260,473 | 4/1981 | Bauer | 208/14 |
| 4,260,489 | 4/1981 | Greig et al. | 210/771 |
| 4,267,061 | 5/1981 | Sima et al. | 210/772 |
| 4,273,644 | 6/1981 | Harris et al. | 208/321 |
| 4,311,561 | 1/1982 | Hastings | 196/14.52 |
| 4,335,001 | 6/1982 | Aurelle et al. | 210/708 |
| 4,341,619 | 7/1982 | Poska | 208/11 LE |
| 4,353,794 | 10/1982 | Winter et al. | 208/321 |
| 4,354,928 | 10/1982 | Audik et al. | 208/309 |
| 4,374,015 | 2/1983 | Brulé | 208/8 LE |
| 4,389,300 | 6/1983 | Mitchell | 208/11 LE |
| 4,397,736 | 8/1983 | Low | 208/323 |
| 4,415,442 | 11/1983 | Rhodes | 208/177 |
| 4,416,764 | 11/1983 | Gikis et al. | 208/11 LE |
| 4,434,028 | 2/1984 | Eppig et al. | 196/14.52 |
| 4,444,654 | 4/1984 | Cargle et al. | 208/188 |
| 4,450,067 | 5/1984 | Angerrni et al. | |
| 4,476,012 | 10/1984 | Gatsis | 208/251 R |
| 4,501,671 | 2/1985 | Bozell | 210/781 |
| 4,517,099 | 5/1985 | Breckner | 210/741 |
| 4,519,848 | 5/1985 | Underwood | 134/34 |
| 4,536,283 | 8/1985 | Davis | 208/309 |
| 4,550,090 | 10/1985 | Degman et al. | 502/25 |
| 4,568,447 | 2/1986 | Piyado et al. | 208/177 |
| 4,572,777 | 2/1986 | Peck | 208/11 LE |
| 4,634,520 | 1/1987 | Angelov et al. | 208/309 |
| 4,664,788 | 5/1987 | Gir et al. | 208/415 |
| 4,675,101 | 6/1987 | Warzinski | 208/311 |
| 4,686,048 | 8/1987 | Atherton et al. | 210/777 |
| 4,715,932 | 12/1987 | Misselhorn et al. | 203/43 |
| 4,741,806 | 5/1988 | Scinta | 196/14.52 |
| 4,741,807 | 5/1988 | Wilhelm et al. | 196/14.52 |
| 4,741,840 | 5/1988 | Atherton et al. | 210/771 |
| 4,755,278 | 7/1988 | Baumgartner | 208/323 |
| 4,798,668 | 1/1989 | Ho | 208/428 |
| 4,842,715 | 6/1989 | Paspek, Jr. et al. | 208/337 |
| 4,885,079 | 12/1989 | Eppig et al. | 208/13 |
| 4,981,579 | 1/1991 | Paspek et al. | 208/13 |

OTHER PUBLICATIONS

Kingsley, G. S., "Pilot Plant Evaluation of Critical Fluid Extractions for Environmental Applications", Critical Fluid Systems, Inc., EPA Contract No. 68-0-2-3924, EPA/600/2-85/081, Jul., 1985.

Mitchell, David L. et al., "The Solubility of Asphaltenes in Hydrocarbon Solvents", Fuel vol. 52, Apr. 1973, pp. 149–152.

L. A. Duval, "Steel Industry Sludge is Being Reused", Environmental Science and Technology, vol. 9, p. 624 (1975).

M. J. Deitrich et al., "Wet Oxidation of Hazardous Organics in Wastewater", Environmental Proress, Aug. 1985, p. 171.

C. C. Allen et al, "Techniques for Treating Hazardous Wastes to Remove Volatile Organic Constituents", Journal of the Air Pollution Control Association, vol. 35, No. 8, pp. 841–848 (1985).

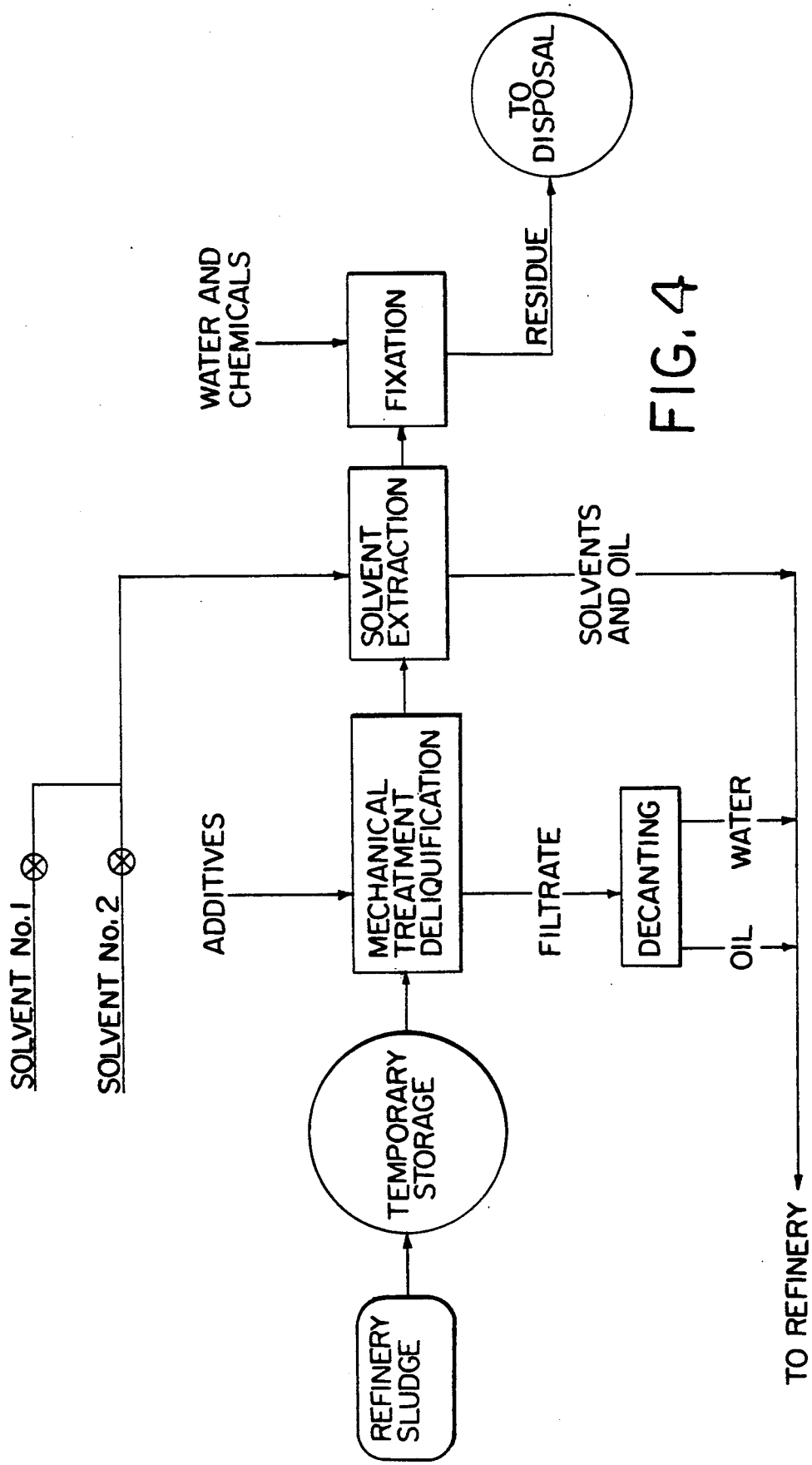

PROCESS FOR SEPARATING EXTRACTABLE ORGANIC MATERIAL FROM COMPOSITIONS COMPRISING SAID EXTRACTABLE ORGANIC MATERIAL INTERMIXED WITH SOLIDS AND WATER USING A SOLVENT MIXTURE

This application is a continuation-in-part of U.S. application Ser. No. 320,865 filed Mar. 7, 1989, and issued on Dec. 9, 1989, as U.S. Pat. No. 4,885,079, which was a continuation of U.S. application Ser. No. 906,727, filed Sept. 12, 1986, abandoned. This application is also a continuation-in-part of U.S. application Ser. No. 278,967, filed Dec. 2, 1988, and issued on Jan. 1, 1991, as U.S. Pat. No. 4,981,579. The disclosures of said prior application are incorporated herein by reference in their entireties.

TECHNICAL FIELD

This invention relates to a process for separating an extractable organic material from a composition comprising said extractable organic material intermixed with solids and water using a solvent mixture comprising at least two solvents. This invention is particularly suitable for separating undesirable organics from solid wastes and hazardous wastes (e.g., petroleum waste, refinery sludge, and the like). It is also suitable for extracting oil from seeds (e.g., cotton seeds), corn, soybeans, etc.; and for extracting oil from oil-contaminated catalyst fines, filter aids, drill cuttings, steel mill waste, bleaching clay, etc. The process is also useful for cleaning filter beds, waste-contaminated soil, etc., and for extracting bitumen from tar sands.

BACKGROUND OF THE INVENTION

Oily wastewater streams are generated at many different refinery processing units and discharged to a refinery wastewater treatment system where treatment by gravity separation and dissolved air flotation generates oily solid streams. These oily solid wastes are regulated under the Resource, Conservation, and Recovery Act (RCRA) as listed hazardous wastes. Additionally, sludge from product tanks, slop oil emulsion solids, and heat exchanger bundle solids are considered listed hazardous waste. These sludges as a group are typically 1%-50% solids and 5%-80% oil as generated. 15,000 to 20,000 gal/day are generated at a typical petroleum refinery.

Many refineries currently deliquify these wastes and either land dispose or land treat the remaining solids. However, the 1984 Amendments to RCRA required the Environmental Protection Agency (EPA) to identify and promulgate a system of pretreatment of all hazardous wastes prior to land disposal or land treatment. EPA's choice of pretreatment was required to be based on the best demonstrated available technology and was required by Congress to be in effect by Aug. 8, 1988 for petroleum refinery wastes. If EPA did not meet this deadline, the legislative "hammer" would be the automatic prohibition of land disposal for the waste in question. This prohibition would take effect May 8, 1990. Various technologies for treating listed hazardous refinery oil sludges to render them delistable or acceptable for land disposal under the RCRA landban have been suggested, but none have been found to be entirely satisfactory.

U.S. Pat. No. 4,311,561 discloses a method for extracting bitumen from tar sand wherein the tar sand and a solvent flow in one direction through a plurality of interconnected individually sealed extraction chambers with the flow of extracted bitumen and solvent counter to the flow of tar sand and solvent. The solvents identified as being useful are hexane, pentane, benzene, halogenated liquids and xylene. The amount of bitumen in the tar sand is progressively reduced from reaction chamber to reaction chamber until the final chamber where sand and solvent alone are treated with hot water to remove the solvent and then discharge pure sand.

U.S. Pat. No. 4,341,619 discloses a process for recovering carbonaceous materials from tar sands by supercritical extraction involving countercurrent flow of the tar sand and a solvent. The solvents that are disclosed as being useful include aromatic hydrocarbons, alicyclic hydrocarbons having 5-16 carbon atoms, phenols, and nitrogen-containing compounds.

U.S. Pat. No. 4,415,442 discloses a process for the separation of entrained organic fluids from gaseous streams in a coal deashing system wherein a feed consisting of solvent, soluble coal products and insoluble coal products are placed in a first separation zone. A first heavy fraction is withdrawn from the first separation zone and the pressure level is reduced by at least 100 psig to vaporize the solvent and yield the insoluble coal products in a relatively dry, powdery form referred to in the specification as "an ash concentrate". The ash concentrate and solvent are mixed with a carrier fluid, the mixing being sufficient to obtain a turbulent flow and to scrub the vaporized solvent. The scrubbing of the vaporized solvent removes entrained organic fluids from it. The mixture is then placed in a second separation zone wherein the scrubbed solvent is separated from ash concentrate. Among the solvents described as being useful are aromatic hydrocarbons (e.g., benzene, xylene), cycloparaffins (e.g., cyclohexane), open chain monoolefins having boiling points below about 310° F. (e.g., butene, pentene), and open chain saturated hydrocarbons having boiling points below about 310° F. (e.g., pentane, hexane, heptane).

U.S. Pat. No. 4,434,028 discloses a process for removing oil and other organic constituents from particulate, inorganic-rich mineral solids (e.g., oil-contaminated drill cuttings) using an extractant that is in a gaseous state at atmospheric pressure and ambient temperature and is converted to a liquid or supercritical fluid during the extraction process. Extractants that are described as being useful are carbon dioxide, ethane, ethylene, propane, propylene, other hydrocarbons, and the gaseous halogenated hydrocarbons such as dichlorodifluoromethane. The process involves the steps of: separating the drill cuttings from a drilling mud in a separator; slurrying the cuttings using an oil or aqueous liquid in a slurry tank; conveying the slurry to an extractor column; circulating liquefied extractant through the extractor column in contact with the drill cuttings until the desired level of oil is extracted; advancing the extractant-oil mixture from the extractor column through a pressure reduction valve to a separator-evaporator wherein the extractant-oil mixture separates into two phases, one being an extractant phase, the other being an oil-enriched phase. The extractant phase is recirculated to the extractor column. The oil-enriched phase is subjected to subsequent separations wherein the extractant is separated from the oil. Upon completion of the extraction cycle, a water piston is advanced through the extractor column to remove remaining oil and extractant from the drill cuttings. Water is then added to the clean drill cuttings to form a slurry in the extractor column which is removed and disposed of or further treated.

U.S. Pat. No. 4,450,067 discloses a process for producing low CCR maltenic fractions and high CCR asphaltenic fractions from hydrocarbonaceous residua and other heavy oils by multisolvent-distillation -induced polarity gradient extraction. The process comprises the steps of contacting two or more suitable solvents (e.g., propanetoluene) with said residua in a liquid flooded distillation column operating in a liquid continuous mode, said solvents having a high and a low boiling point with respect to one another, said higher boiling solvent having a higher relative polarity than said lower boiling solvent and each of said boiling points being sufficiently lower than that of the residua so that the solvents are distilled into high and low polarity fractions thereby forming a low CCR maltenic overhead stream and a high CCR asphaltenic bottoms stream and thereafter recovering the solvents from the overhead stream and the bottoms stream, and recycling the solvents for reuse.

The final report for EPA Contract No. 68-02-3924 which is entitled "Pilot Plant Evaluation of Critical Fluid Extractions for Environmental Applications" discloses the results of using liquified-gas solvents in a pilot plant to extract oil from steel mill scale and bleaching clay. Two systems are described (1) use of liquid dichlorodifluoromethane to partially extract "hydrocarbon oil" from steel mill scale, and (2) use of a non-identified solvent to remove vegetable oil (triglycerides) from bleaching clay. The report states that residual oils on both steel mill wastes and bleaching clays are soluble in liquid gas solvents such as propane.

There is a need for an efficient, economical and reliable process for separating undesirable extractable organic materials from solid wastes, hazardous wastes, and the like, to render the product solids delistable or acceptable for land disposal. It would be advantageous if this process was adaptable to separating extractable organic materials from other compositions wherein such extractable organic materials are intermixed with solids and water.

SUMMARY OF THE INVENTION

This invention provides for a process for separating extractable organic material from a feed composition comprising said extractable organic material intermixed with solids and water, the process comprising:

(A) contacting said feed composition with a solvent mixture in an enclosed space, said solvent mixture comprising at least one first organic solvent and at least one second organic solvent, said first organic solvent being capable of dissolving at least about ten parts of said extractable organic material per million parts of said first organic solvent at the temperature wherein at least about 50% by weight of said first organic solvent boils at atmospheric pressure, said second organic solvent being different than and more volatile than said first organic solvent and being capable of dissolving at least about ten parts of said first organic solvent per million parts of said second organic solvent at the temperature wherein at least about 50% by weight of said second organic solvent boils at atmospheric pressure;

(B) dissolving at least part of said extractable organic material in said solvent mixture to form a solvent-extract mixture; and (C) separating at least part of said solvent-extract mixture from the contents of said enclosed space, the remaining contents in said enclosed space comprising a treated product.

BRIEF DESCRIPTION OF THE DRAWINGS

FIG. 4 is a flow sheet illustrating a refinery sludge treatment process wherein the inventive extraction process is used in combination with mechanical treatment for volume reduction and chemical fixation for metal constituent immobilization.

DESCRIPTION OF THE PREFERRED EMBODIMENTS

Figure 1:
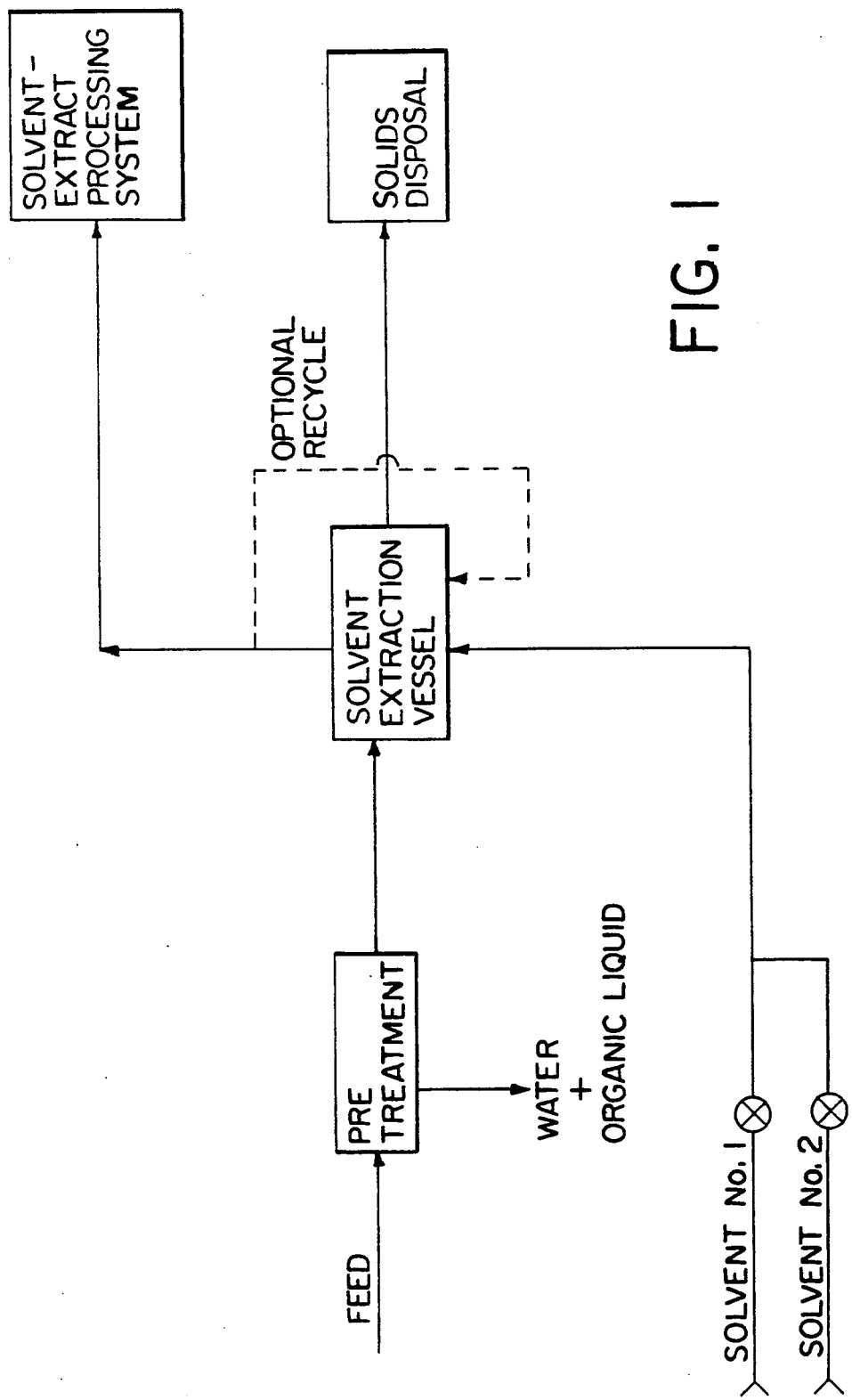
FIG. 1 is a flow sheet illustrating one embodiment of the invention wherein a batch process is used to separate extractable organic material from a feed composition comprising said extractable organic material intermixed with solids and water.

The feed composition that can be treated in accordance with the invention comprises an extractable organic material intermixed with solids and water. The extractable organic material is typically in a liquid state at the pressure and temperature employed in the operation of the inventive process, although part of such extractable organic material may be in a solid state at such pressure and temperature. The solids can be in any form, but in many instances are in the form of particulate solids. The solids can be porous, and in many instances these porous solids are filled with liquid (e.g., water, organic liquid). These compositions can include free water. The term "free water" is used herein to refer to water that does not adhere to the surface of the solids of the feed composition or is not trapped within voids in such solids. These feed compositions typically comprise:

(i) up to about 98% by weight water;
(ii) up to about 98% by weight inorganic solids;
(iii) up to about 98% by weight organic solids;
(iv) up to about 98% by weight organic liquid;
(v) up to about 98% by weight metals and/or metal compounds; and
(vi) up to about 98% by weight four- and/or five-ring polynuclear aromatic compounds.

The feed compositions that can be treated include solid waste and/or hazardous waste, including petroleum waste, refinery sludge and production sludge. The term "solid waste" refers to any garbage, sludge or other waste material not excluded by EPA definitions. The term "hazardous waste" refers to solid waste or combinations of solid waste which are "listed" by the EPA as hazardous, or which exhibit ignitability, corrosivity or reactivity, or are considered toxic pursuant to relevant governmental rules or regulations. The term "petroleum waste" refers to any waste material containing petroleum or hydrocarbon oil intermixed with solids and water. The term "refinery sludge" refers to sludges generated in petroleum refinery operations that contain petroleum or hydrocarbon oils intermixed with solids and water; these sludges usually contain heavy residual organics such as asphaltenes. The term "production sludge" refers to sludges generated at the well head of an oil well; these sludges typically contain oil, water, bitumen, tar sand, dirt, clay, pipe scale, drilling residues, and the like.

The feed compositions that can be treated also include oil-contaminated catalyst fines (a refinery by-product), oil-contaminated drill cuttings (an oil well drilling by-product), oil-contaminated mill scale (a steel mill by-product), oil-contaminated filter aids (e.g., clays, lime, diatomaceous earth), oil-contaminated bleaching clay (a vegetable oil filtering media), and the like. A specific example of the oil-contaminated catalyst fines that can be treated are the fines in decanter oil streams from fluid catalytic cracking units. These feed compositions also include seeds (e.g., cotton seeds), soybeans, corn and the like. The process is useful in cleaning filter beds, contaminated soil (e.g., tank truck spills, drainage ditch bottoms), etc. The process can be used to separate bitumen from tar sands.

The solvent mixture that is used in the inventive process comprises a first organic solvent and a second organic solvent, the second organic solvent being different than the first organic solvent. The first organic solvent preferably has a higher solubility parameter than the second organic solvent. The second organic solvent is more volatile than the first organic solvent. The solvent mixture composition can be varied as a function of the extent of extraction desired, and it can be varied depending on changes in the feed composition being treated. In one embodiment of the invention the ratio of said first organic solvent to said second organic solvent is from about 95:5 to about 5:95, more preferably about 90:10 to about 10:90, more preferably about 80:20 to about 20:80, more preferably about 70:30 to about 30:70, more preferably about 60:40 to about 40:60.

The first organic solvent used in the inventive process is preferably capable of dissolving at least about 10 parts of the extractable organic material in the feed composition being treated per million parts of said first organic solvent at the temperature wherein at least about 50% by weight of said first organic solvent boils at atmospheric pressure. This solvent is preferably selected from those organic fluids which: dissolve hydrocarbon oil and heavy residual organics such as asphaltenes at modest temperatures (e.g., in the range of about 30 to about 400° F., preferably about 200° F. to about 300° F.) and at moderate pressures (e.g., below about 500 psig); can be separated from water and such hydrocarbon oil and heavy residual organics using conventional separation techniques; and can be stripped using a volatile organic solvent in accordance with the inventive process. These solvents include aromatic compounds, cycloaliphatic compounds, aliphatic-substituted aromatic compounds, cycloaliphatic-substituted aromatic compounds, aliphatic-substituted cycloaliphatic compounds, and mixtures thereof. These compounds include substantially hydrocarbon compounds as well as purely hydrocarbon compounds. The term "substantially hydrocarbon" is used herein to mean that the compounds contain no non-hydrocarbon substituents or non-carbon atoms that significantly affect the hydrocarbon characteristics or properties of such compounds relevant to their use herein as solvents. The aromatic compounds can be mononuclear (e.g., benzene) or polynuclear (e.g., naphthalene, anthracene, etc.). The aliphatic substituents on the aromatic compounds can be straight chain hydrocarbon groups of 1 to about 3 carbons, cyclic groups of about 3 to about 6 carbons, or mixtures thereof. The aromatic compounds can be mono-substituted or poly-substituted. The poly-substituted aromatic compounds are preferably di-substituted. Examples include toluene, the xylenes, ethyl benzene, cyclohexyl benzene, etc. The cycloaliphatic compounds can have from about 3 to about 6 ring carbon atoms, preferably 5 or 6 ring carbon atoms, and can be saturated or unsaturated. Examples include cyclopropane, cyclobutane, cyclopentane, cyclopentene, 1,3-cyclopentadiene, cyclohexane, cyclohexene, 1,3-cyclohexadiene, etc. The aliphatic substituents on the aliphatic-substituted cycloaliphatic compounds can be straight chain hydrocarbon groups of 1 to about 6 carbon atoms, preferably 1 to about 3 carbon atoms. The rings of the cycloaliphatic compounds can be mono-substituted or poly-substituted. The poly-substituted compounds are preferably di-substituted. Examples include methylcyclopentane, methylcyclohexane, 1,3-dimethylcyclohexane, 3-ethylcyclopentene, 3,5-dimethylcyclopentene, etc. Ethers such as methyl tertiary butyl ether are useful.

The first organic solvent preferably has an initial boiling point in the range of about 0° F. to about 500° F., and a final boiling point in the range of about 200° F. to about 1000° F. at atmospheric pressure. These solvents can have an aromatic content in excess of about 25% by weight, and in many instances they have an aromatic content in excess of about 50% by weight. In one embodiment, this solvent has an initial boiling point in the range of about 50° F. to about 150° F., and a final boiling point in the range of about 200° F. to about 300° F. In another embodiment, this solvent has an initial boiling point in the range of about 180° F. to about 280° F., and a final boiling point in the range of about 325° F. to about 425° F. In another embodiment, this solvent has an initial boiling point in the range of about 200° F. to about 325° F., and a final boiling point in the range of about 425° F. to about 525° F. In another embodiment, this solvent has an initial boiling point in the range of about 300° F. to about 500° F., and a final boiling point in the range of about 650° F. to about 850° F. In one embodiment, at least about 50% by weight, more preferably at least about 75% by weight, more preferably at least about 90% by weight, of this solvent boils at a temperature below about 750° F. at atmospheric pressure, and all or substantially all of said solvent boils at a temperature below about 1000° F. at atmospheric pressure. A useful solvent has an initial boiling point in the range of about 200° F. to about 325° F., preferably about 260° F. to about 290° F., a 90% by weight boiling point in the range of about 350° F. to about 450° F., preferably about 380° F. to about 420° F. (that is, 90% by weight of the solvent boils at a temperature below about 350° F. to about 450° F. at atmospheric pressure), and a final boiling point in the range of about 425° F. to about 525° F., preferably about 460° F. to about 490° F.; this solvent preferably contains in excess of about 50% by weight aromatics, more preferably in excess of about 75% by weight aromatics, more preferably in excess of about 90% by weight aromatics. Another useful solvent has an initial boiling point in the range of about 300° F. to about 500° F., preferably about 360° F. to about 420° F., a final boiling point in the range of about 650° F. to about 850° F., preferably about 720° F. to about 780° F.;

this solvent preferably has an aromatics content of in excess of about 50% by volume, preferably in the range of about 50% to about 90% by volume, more preferably about 60% to about 80% by volume.

The first organic solvent can be an aromatic or aromatic-rich solvent that is readily available from a refinery system such as, for example, one or more reformates (e.g., light reformate, heavy reformate, etc.) that are produced by reformers in a typical refinery system. A typical light reformate has an initial boiling point in the range of about 50° F. to about 150° F., a final boiling point in the range of about 250° F. to about 350° F., and contains benzene and toluene. A typical heavy reformate has an initial boiling point in the range of about 250° F. to about 350° F., a final boiling point in the range of about 450° F. to about 550° F., and contains toluene, ethylbenzene, o-xylene and p-xylene.

The first organic solvent can be a middle distillate such as fuel oil (e.g., straight run distillates, diesel oil, etc.), kerosene, and the like. The first organic solvent can be a natural gas condensate comprising hydrocarbons of about 7 to about 12 carbon atoms and having an aromatic and/or naphthene content of about 40% to about 90% by weight.

The second organic solvent is preferably capable of dissolving at least about 10 parts of the above-discussed first organic solvent per million parts of said second organic solvent at the temperature wherein at least about 50% by weight of said second organic solvent boils at atmospheric pressure. This solvent preferably has a sufficiently low viscosity so that at economical flow rates unmanageable pressure drops are not experienced when the feed composition being treated is in the form of a fixed bed of solids. This solvent also preferably has a sufficiently low viscosity so that at such flow rates excessive entrainments are not experienced when the feed composition is in the form of an agitated or fluidized bed of solids. This solvent is preferably economically recoverable from the treated product solids once the inventive process has been completed. Preferred second organic solvents include aliphatic, aromatic and cycloaliphatic hydrocarbons having from 2 to about 9 carbon atoms, preferably from 3 to about 5 carbon atoms; halohydrocarbons of from 1 to about 9 carbon atoms, preferably 1 to about 5 carbon atoms, more preferably 1 to about 3 carbon atoms; and mixtures of two or more of any of the foregoing. Examples of such solvents include propane, cyclopropane, propylene, n-butane, isobutane, cyclobutane, butene (e.g., butene-1, cis-butene-2, trans-butene-2), butadiene (e.g., 1,3-butadiene), isobutylene, n-pentane, isopentane, neopentane, cyclopentane, pentene (e.g., pentene-1, cis-pentene-2, etc.), cyclopentene, pentadiene (e.g., 1,3-pentadiene, etc.), cyclopentadiene, cyclohexane, cyclohexene, cyclohexadiene, methylene chloride, dichlorodifluoromethane, trichlorofluoromethane, cloroethane, trichloroethane, dichlorotetrafluoroethane, trichloroethylene, tetrafluoroethylene, chloropropane, chlorobutane, chloropentane, dichloropentane, and mixtures of two or more thereof. Also useful are aromatic compounds such as benzene, toluene and the xylenes. This solvent can be a mixture made up primarily of hydrocarbon compounds or substantially hydrocarbon compounds of from about 3 to about 5 carbon atoms (e.g., natural gas condensates of about 3 to about 5 carbon atoms) and/or from about 5 to about 7 carbon atoms (e.g., gas well condensates such as those comprising hydrocarbons of from about 5 to about 7 carbon atoms). Liquified petroleum gas (LPG) is useful. Examples of commercial grades of LPG include Commercial Propane, Commercial Butane, Commercial Propane-Butane Mixtures, Special Duty Propane and Propane HD-5. Straight-run gasoline is useful. Mixtures of two or more of the foregoing solvents can be used.

In one embodiment of the invention, the solvent mixture that is used in the inventive process has a solubility parameter that closely matches the solubility parameter of the extractable organic material that is to be separated from the feed composition. The solubility parameter of a solvent is a measurement for quantifying the "strength" of a solvent. That is, the solubility parameter is a measure of the ability of a solvent to dissolve a solute.

Single parameter solubility parameters are useful in approximating the solubility of a hydrocarbon solute in a hydrocarbon solvent. Single parameter solubility parameters can be represented by delta, defined as the square root of the molecular cohesive energy $(-E)$ per unit volume of solvent, and have the units $(cal/ml)^{\frac{1}{2}}$. Table I is a list of single parameter solubility parameters for various solvents that are useful with the invention. (The molar volume for each of such solvents is also indicated in Table I; such molar volume is useful in calculating the solubility parameter for mixtures of solvents as discussed below).

TABLE I

|  | Delta $(cal./ml.)^{\frac{1}{2}}$ | Molar Volume (ml./gm-mole) |
|---|---|---|
| Ethane | 6.05 | 68 |
| Propane | 6.40 | 84 |
| i-Butane | 6.73 | 105.5 |
| n-Butane | 6.73 | 101.4 |
| i-Pentane | 7.02 | 117.4 |
| n-Pentane | 7.02 | 116.1 |
| neo-Pentane | 7.02 | 123.3 |
| n-Hexane | 7.27 | 131.6 |
| n-Heptane | 7.43 | 147.5 |
| n-Octane | 7.55 | 163.5 |
| n-Nonane | 7.65 | 179.6 |
| n-Decane | 7.72 | 196.0 |
| n-Undecane | 7.79 | 212.2 |
| n-Dodecane | 7.84 | 228.6 |
| n-Hexadecane | 7.99 | 294.1 |
| Ethylene | 6.08 | 61 |
| Propylene | 6.43 | 79 |
| Cyclopentane | 8.11 | 94.7 |
| Methylcyclopentane | 7.85 | 113.1 |
| Cyclohexane | 8.20 | 108.7 |
| Methylcyclohexane | 7.83 | 128.3 |
| Benzene | 9.16 | 89.4 |
| Toluene | 8.92 | 106.8 |
| o-Xylene | 8.99 | 121.2 |
| m-Xylene | 8.82 | 123.5 |
| p-Xylene | 8.77 | 124.0 |

The single parameter solubility parameter for a mixture of solvents is the weighted mean of the pure component solubility parameters and can be calculated using the formula $$\text{Delta}_{mix} = \frac{\Sigma X_i V_i \text{Delta}_i}{\Sigma X_i V_i}$$

wherein: Delta$_{mix}$ is the solubility parameter of the mixture; $X_i$ is the mole fraction of pure component i; $V_i$ is the molar volume of pure component i; and Delta$_i$ is the solubility parameter of the pure component i. For example, in one embodiment of the invention the solvent mixture that is used is comprised of toluene and n-pentane. Table II provides a list of single parameter solubility parameters for various mixtures of these two solvents.

TABLE II

| Mole Fraction Toluene | Mole Fraction n-pentane | Delta (cal./ml.)$^{\frac{1}{2}}$ |
| --- | --- | --- |
| 0.0 | 1.0 | 7.02 |
| 0.1 | 0.9 | 7.21 |
| 0.2 | 0.8 | 7.40 |
| 0.3 | 0.7 | 7.59 |
| 0.4 | 0.6 | 7.78 |
| 0.5 | 0.5 | 7.97 |
| 0.6 | 0.4 | 8.16 |
| 0.7 | 0.3 | 8.35 |
| 0.8 | 0.2 | 8.54 |
| 0.9 | 0.1 | 8.73 |
| 1.0 | 0.0 | 8.92 |

In one embodiment of the invention, the single parameter solubility parameter for the first organic solvent is preferably in the range of about 7 to about 14 (cal /ml.)$^{\frac{1}{2}}$ at 70° F. The single parameter solubility parameter for the second organic solvent is preferably in the range of about 5.5 to 8.5 (cal./ml.)$^{\frac{1}{2}}$ at 70° F. The single parameter solubility parameter for the solvent mixture is preferably in the range of about 6 to about 13 (cal./ml.)$^{\frac{1}{2}}$ at 70° F.

The single parameter solubility parameter that is preferred for the solvent mixture that is used with the inventive process is dependent upon the single parameter solubility parameter of the particular extractable organic material that is to be separated from the feed composition. In one embodiment of the invention, the single parameter solubility parameter of the solvent mixture matches the single parameter solubility parameter of such extractable organic material within reasonable limitations in order to provide the desired level of extraction. In said embodiment, the single parameter solubility parameter of the solvent mixture is preferably within about ±2 (cal./ml.)$^{\frac{1}{2}}$ at 70° F. of the single parameter solubility parameter at 70° F. of the extractable organic material that is to be separated from the feed composition. More preferably, the single parameter solubility parameter of the solvent mixture is within about ±1.5 (cal./ml.)$^{\frac{1}{2}}$ at 70° F. of the single parameter solubility parameter of the extractable organic material that is to be separated from the feed composition, more preferably within about ±1 (cal./ml.)$^{\frac{1}{2}}$, more preferably within about ±0.5 (cal./ml.)$^{\frac{1}{2}}$, more preferably within about ±0.25 (cal./ml.)$^{\frac{1}{2}}$.

If the extractable organic material that is to be separated consists of a mixture of several organic materials, then in order to provide the most effective extraction, it is preferred to match the solubility parameter of the solvent mixture with the solubility parameter of the more difficult to extract organic materials in the feed composition. For example, in a typical refinery sludge, the more difficult to extract organic materials are typically heavy oils and asphaltenes. In many instances, such heavy oils and asphaltenes have single parameter solubility parameters of about 8 to about 11 cal./ml.)$^{\frac{1}{2}}$ at 70° F., and thus the solvent mixtures that are preferred for separating these materials have single parameter solubility parameters at 70° F. preferably in the range of about 6 to about 13 (cal /ml.)$^{\frac{1}{2}}$, more preferably about 7 to about 12 (cal./ml.)$^{\frac{1}{2}}$, more preferably about 8 to about 11 (cal./ml.)$^{\frac{1}{2}}$.

The single parameter solubility parameter of an extractable organic material can be determined experimentally by dispersing samples of the extractable organic material in a series of solvents having known single parameter solubility parameters varying over a predetermined range, and measuring the level of dissolution of extractable organic material in each sample. The solvent exhibiting the highest degree of dissolution of extractable organic material therein has the single parameter solubility parameter that matches the single parameter solubility parameter of the extractable organic material most closely. For example, an extractable organic material having a single parameter solubility parameter of about 8 (cal./ml.)$^{\frac{1}{2}}$ that is dissolved in samples of each of the solvents listed in Table I would in general exhibit the highest degree of dissolution in the solvents having single parameter solubility parameters of about 7.5 to about 8.5 (cal./ml.)$^{\frac{1}{2}}$.

Two-parameter solubility parameters are useful in approximating the solubility of a solute in a solvent when the solute (or at least one of the solutes in a mixture of solutes) and/or solvent (or at least one of the solvents in a solvent mixture) contain appreciable quantities of non-hydrocarbon groups (e.g., halo, hydroxy, etc.). Examples of such solutes include the asphaltenes. Examples of such solvents include methylene chloride, dichlorodifluoromethane, trichlorofluoromethane, cloroethane, trichloroethane, dichlorotetrafluoroethane, trichloroethylene, tetrafluoroethylene, chloropropane, chlorobutane, chloropentane, dichloropentane, and mixtures of two or more thereof. With such two-parameter solubility parameters, each solvent (or solvent mixture) and each solute (or mixture of solutes) has two solubility parameters, namely, Delta$_r$ and Delta$_v$. Delta$_r$ and Delta$_v$ for many organic materials are known and readily available from the literature. Delta$_r$ for a solvent or solute mixture is the weighted mean of the pure component Delta$_r$'s for the mixture and is calculated using the formula:

$$\text{Delta}_{r(mix)} = \frac{\Sigma X_i V_i \text{Delta}_{r(i)}}{\Sigma X_i V_i}$$

wherein: Delta$_{r(mix)}$ is the solubility parameter r of the mixture; $X_i$ is the mole fraction of pure component i; $V_i$ is the molar volume of pure component i; and Delta$_{r(i)}$ is the solubility parameter r of the pure component i. Delta$_v$ for a solvent or solute mixture is the weighted mean of the pure component Delta$_v$'s for the mixture and is calculated using the formula:

$$\text{Delta}_{v(mix)} = \frac{\Sigma X_i V_i \text{Delta}_{v(i)}}{\Sigma X_i V_i}$$

wherein: Delta$_{v(mix)}$ is the solubility parameter v of the mixture; $X_i$ is the mole fraction of pure component i; $V_i$ is the molar volume of pure component i; and Delta$_{v(i)}$ is the solubility parameter v of the pure component i. The difference between the two-parameter solubility parameters for the solvent mixture used in accordance with the invention and the extractable organic material to be separated in accordance with the invention can be determined using the formula:

$$A = ((\text{Delta}_{r(s)} - \text{Delta}_{r(e)})^2 + (\text{Delta}_{v(s)} - \text{Delta}_{v(e)})^2)^{\frac{1}{2}}$$

wherein: A is the difference between the two-parameter solubility parameters for the solvent mixture of the invention and the extractable organic material to be separated; Delta$_{r(s)}$ is Delta$_r$ for the solvent mixture; Delta$_{r(e)}$ is Delta$_r$ for the extractable organic material; Delta$_{v(s)}$ is Delta$_v$ for the solvent mixture; and Delta$_{v(e)}$ is Delta$_v$ for the extractable organic material. In one embodiment of the invention, each of the solubility parameters Delta$_{r(s)}$, Delta$_{r(e)}$, Delta$_{v(s)}$ and Delta$_{v(e)}$ are determined at about 70° F. and A is preferably up to about 3 (cal./ml )$^{\frac{1}{2}}$, more preferably up to about 2 (cal./ml.)$^{\frac{1}{2}}$, more preferably up to about 1 (cal./ml.)$^{\frac{1}{2}}$.

Three-parameter solubility parameters are also useful in approximating the solubility of a solute in a solvent. Three-parameter solubility parameters for many organic materials are known in the art. See, for example, Barton, Allan F. M., "CRC Handbook of Solubility Parameters and Other Cohesion Parameters", CRC Press Inc., 2000 Corporate Blvd., N.W., Boca Raton, Fla. 33431, Library of Congress Card No. 82-9653, which is incorporated herein by reference for its disclosure of solubility parameters of solvents used in accordance with this invention and extractable organic materials that are separated in accordance with this invention. The three parameter solubility parameters disclosed in this reference are referred to therein as Delta$_d$, Delta$_p$ and Delta$_h$, and are related to the single-parameter solubility parameters and two-parameter solubility parameters discussed above. Also disclosed in this reference for a number of organic materials is Delta$_t$, which corresponds to the single-parameter solubility parameter for such materials, and is equal to the square root of the sum of the squares of Delta$_d$, Delta$_p$ and Delta$_h$. That is, $$\text{Delta}_t = (\text{Delta}_d^2 + \text{Delta}_p^2 + \text{Delta}_h^2)^{\frac{1}{2}}$$

Thus, using the foregoing formula, the single parameter solubility parameter of a solvent or a solute can be determined if three-parameter solubility parameters for such solvent or solute are known.

The two-parameter solubility parameters for an organic material can be determined if the three-parameter solubility parameters for such material are known. In this regard, Delta$_r$ is equal to Delta$_h$, and Delta$_v$ is equal to the square root of the sum of the squares of Delta$_d$ and Delta$_p$. That is, $$\text{Delta}_r = \text{Delta}_h$$
$$\text{Delta}_v = (\text{Delta}_d^2 + \text{Delta}_p^2)^{\frac{1}{2}}$$

Thus, using the foregoing formula, the two-parameter solubility parameters for the solvents used in accordance with the invention and the extractable organic materials to be separated can be determined if the three-parameter solubility parameters for such materials are known.

In one embodiment of the invention, the composition of the solvent mixture is optimized by using only the minimum amount of the more expensive of the solvents in the solvent mixture to provide a solubility parameter that sufficiently matches the solubility parameter of the extractable organic material to provide a sufficient extraction for the intended purpose. Thus, from an economics perspective, it may be preferable to use a solvent mixture that does not provide the most effective extraction, but provides a degree of extraction that is sufficient for the intended purpose and uses a solvent mixture that is less costly. For example, if it was determined that a solvent mixture having a single parameter solubility parameter of 8 (cal./ml.)$^{\frac{1}{2}}$ would be the most effective solvent mixture, but a less costly solvent mixture having a single parameter solubility parameter of 7 (cal./ml.)$^{\frac{1}{2}}$ was sufficient for the intended purpose, the latter might be preferred.

In one embodiment of the invention, the feed composition to be treated is optionally pretreated to remove some of the water and organic liquid (e.g., oil) prior to treatment in accordance with the inventive process. In this pretreating step, thermal and/or mechanical processing units can be used. Examples include vacuum filters, belt presses, filter presses, centrifuges, hydroclones, decanters, or a combination of the foregoing, the design of which are entirely conventional. A dryer to further de-water the feed composition can be used. If the feed composition contains free water, at least part of such free water can be removed during this pretreatment. In one embodiment of the invention, at least about 20% by weight, more preferably at least about 50% by weight, more preferably at least about 90% by weight of such free water is removed using this pretreatment step. The pretreated feed composition coming off the pretreatment units can be placed in holding bins.

The feed composition produced by the pretreatment units is conveyed to an extraction unit. Conveyance to the extraction unit can be by conveyor belt, screw conveyor, pneumatic equipment, in slurry form, in bags or baskets which are lowered into the extraction unit, or by any other conventional means known in the art. A suitably designed gasketed filter press can serve as both the pretreatment unit and the extraction unit.

In an optional step, the pre-treated feed composition can be mixed with one or more filter aids to facilitate the formation of and/or insure the retention of a fluid-permeable mass or bed of solids. The filter aids that are useful are preferably selected from those materials having a structural integrity that does not degrade significantly when in contact with the organic material intermixed with the solids in the feed composition or the solvents used in accordance with the inventive method. These filter aids also preferably do not contain significant levels of EPA listed materials. Examples of filter aids that are useful include inorganic materials such as diatomaceous earth, vermiculite, perlite, pumice, sand, lime, gravel and the like; organic materials such as excelsior, saw dust, wood chips, straw, ground tree bark, ground corn cobs, deoiled rice bran and the like; and synthetic polymeric materials such as porous polypropylene beads, blown plastics (especially off-specification blown plastics) and the like. Polyelectrolyte polymer flocculating agents are also useful. Mixtures of two or more of the foregoing filter aids can be used. The level of addition of filter aid to the feed composition is typically in the range of zero to about 500% by weight, preferably zero to about 200% by weight, more preferably zero to about 150% by weight, more preferably about 50% to about 100% by weight based on the weight of the dry solids in the feed composition. This optional step of mixing the feed composition with a filter aid can be affected in the pre-treatment unit or in the extraction unit using conventional mixing techniques.

The extraction unit can be one or more pressurized vessels that may be operated in a batch mode, semi-batch mode or in a continuous mode. The extraction unit can be operated in a mixer-settler mode. That is, the feed composition and solvent mixture are mixed and allowed to settle, liquid is decanted off the top or drawn through the bed and removed from the bottom, more solvent mixture is added, and then the sequence is repeated. When multiple vessels are employed, the vessels can be operated in parallel or in staggered sequence. Multiple vessels can be arranged in a cascade wherein effluent extracted from one vessel that contains a relatively low concentration of extractable organic material can be used as the solvent in one or more other vessels. The configuration of the vessel is dependent upon the means of conveyance of the feed composition to the vessel and the treated product from the vessel. For example, if the feed composition is conveyed to the vessel in slurry form, nozzles with ball valves or pinch valves can satisfactorily seal the vessel. If the feed composition is conveyed by large bag or basket, large diameter hatch closures can be used to satisfactorily provide closure of the vessel. For pneumatic conveyance of the treated product solids from the vessels, conventional designs including cone-shaped bottoms with manifolds of air-jet nozzles can be used. Continuous systems employing lock-hoppers or rotary valves can be used. The treated product solids can also be conveyed from the extraction vessel by slurrying the solids with water followed by an appropriate de-watering step using, for example, vacuum drum filters, clarifiers, settling tanks, centrifuges, sludge dryers and the like. The treated product solids can also be conveyed from the extractor vessel by slurrying them in a light hydrocarbon liquid of, for example, from about 3 to about 5 carbon atoms (e.g., propane, butane, pentane, etc.) and then transferring the slurry to a low pressure lock hopper. The hydrocarbon liquid is thereafter separated from the solids using conventional techniques (e.g., flashing, steam stripping, etc.). The extraction vessels can employ mechanical agitators, and heating/cooling jackets as well as external thermal insulation.

The direction of flow of the solvents used in the inventive process through the solids of the feed composition can be upwardly, downwardly, radially, co-currently, counter-currently, or it can alternate between any of the foregoing. While not wishing to be bound by theory, it is believed that the mechanism by which the solvents effect separation of the extractable organic material from the solids of the feed composition involves (1) a sweeping action wherein the solvent mixture advances through the feed composition and displaces the organic material intermixed therein and (2) an extraction wherein the extractable organic material dissolves or disperses in the solvent mixture and is carried away from the solids with such solvent mixture.

The extraction unit effluent of extractable organic material and solvents can be disposed of directly (e.g., in the case wherein the feed composition being treated is a refinery sludge, the effluent can be combined with an appropriate refinery stream) or the effluent can be treated to separate the extractable organic material from the solvents. The solvents can then be recycled. Separation can be accomplished by a number of means discussed in greater detail below including flashing and distillation.

One method for recycling the solvents involves using a pump and a heater to pump the solvents through the extraction vessel until the desired bed temperature is reached. A heated storage tank is employed to store the extraction vessel fluid effluent. A continuous flash/distillation system can be used to separate the solvents from the extracted organic materials. A cooler and separator can be used to separate water from the solvents.

The extraction vessel is filled with the feed composition conveyed from the pretreatment unit. In applications wherein a slurry fill is used, the excess slurry solvent may be drained down. With other filling methods, an inert gas purge can be used. With a batch or semi-batch operation the extraction vessel is typically pressurized to the desired operating pressure after the vessel is filled with the feed composition. With a continuous or semi-continuous operation pressure within the extraction vessel is typically at the desired operating level when the feed composition is added. In either case, however, it is to be understood that the inventive process can be operated at atmospheric pressure.

Steps (A) and (B) of the inventive process are affected by introducing the solvent mixture into the extraction unit and mixing it with the feed composition for an effective period of time to extract a desired amount of the extractable organic material from said feed composition and thus form a mixture of said extractable organic material and said solvents. The temperature within the extraction unit during this stage of the process is preferably in the range of about 0° F. to about 800° F., more preferably about 50° F. to about 300° F., more preferably about 150° F. to about 250° F. The pressure within the extraction unit during this stage of the process is preferably in the range of about atmospheric pressure to about 500 psig, more preferably in the range of about atmospheric pressure to about 300 psig, more preferably in the range of about atmospheric pressure to about 150 psig, more preferably about atmospheric pressure to about 100 psig, more preferably about atmospheric pressure to about 50 psig. The average contact time between the solvent mixture and the solids in said feed composition is preferably in the range of about 0.01 minute to about 100 hours, more preferably in the range of about 1 second to about 8 hours, more preferably in the range of about 1 second to about 1 hour. The temperature and pressure are set at levels so that preferably at least about 30% by weight, more preferably at least about 50% by weight, more preferably at least about 70% by weight, more preferably at least about 90% by weight of the solvent mixture is in a condensed state. During this step of the process, mechanical means are preferably employed to agitate the mixture of feed composition and solvents. Conventional techniques such as the use of static or non-static mixers, simple mixers, and recirculating pumps can be used.

Step (C) of the inventive process is affected by separating the mixture of extractable organic material and solvents from the solids of the feed composition preferably using mechanical separation means such as filtration, centrifugation, hydrocycloning or settling. The remaining solids constitute the treated product. Typically, at least part of the water present in the pretreated feed composition remains mixed with the treated product.

Steps (A), (B) and (C) of the inventive process can be repeated until desired levels of extraction have been achieved. With subsequent extractions the same or different solvent mixtures can be used, and the same or different operating parameters (e.g., temperature, pressure, etc.) can be used.

At the end of steps (A), (B) and (C), any solvent remaining intermixed with the treated product can be separated using conventional techniques (e.g., steam stripping, flashing, drying, etc.). Because of its relatively high volatility, the second organic solvent is typically removed from the treated product relatively easily using such techniques. Preferably, most or all of the first organic solvent is removed with the second organic solvent. However, in some instances, some of the first organic solvent may remain intermixed with the treated product. If unacceptable levels of the first organic solvent remain intermixed with the treated product, a supplementary organic solvent can be used to extract such first organic solvent. This additional extraction can be conducted in the extraction unit. The supplementary organic solvent can be any of the second organic solvents discussed above. Thus the supplementary organic solvent is more volatile than the first organic solvent and is capable of dissolving at least about ten parts of said first organic solvent per million parts of said supplementary organic solvent at the temperature wherein at least about 50% by weight of said supplementary organic solvent boils at atmospheric pressure. In one embodiment of the invention, the second organic solvent and the supplementary organic solvent are the same. The temperature within the extraction unit during this step of the process is preferably in the range of about 0° F. to about 500° F., more preferably about 0° F. to about 300° F., more preferably to about 150° F. The pressure within the extraction unit during this step of the process is preferably in the range of atmospheric pressure to about 1000 psig, more preferably in the range of atmospheric pressure to about 500 psig, more preferably in the range of atmospheric pressure to about 300 psig. The average contact time between the supplementary organic solvent and the treated product solids is preferably in the range of about 0.01 minute to about 100 hours, more preferably about 1 second to about 8 hours, more preferably about 1 second to about 1 hour. The temperature, pressure and flow rate of the supplementary organic solvent are set at levels so that preferably at least about 30% by weight, more preferably at least about 50% by weight, more preferably at least about 70% by weight, more preferably at least about 90% by weight of the solvent is in a condensed state. When in such a condensed state, this supplementary organic solvent preferably has a density in excess of about 15 pounds per cubic foot, more preferably in excess of about 20 pounds per cubic foot, more preferably in excess of about 25 pounds per cubic foot. When the solvent is propane, the upper limit is preferably about 33 pounds per cubic foot. When the solvent is butane, the upper limit is preferably in the range of about 35 to about 40 pounds per cubic foot. The flow of the supplementary organic solvent through the solids is continued until a desired amount of the first organic solvent is extracted from the solids. During this step of the process, mechanical means are preferably employed to agitate the mixture of solids and supplementary organic solvent. Conventional techniques such as the use of non-static mixers, simple mixers, and recirculating pumps can be used. The mixture of first organic solvent and supplementary organic solvent can be separated from the solids using conventional techniques such as filtration, steam stripping, etc. This mixture can be separated by displacement with water or an inert gas or by draining the solution from the extraction unit prior to depressurizing it. This step of process is conducted until all of the first organic solvent is extracted from the solids, or until the concentration of said first organic solvent remaining intermixed with the solids is reduced to an acceptable level. If the level of first organic solvent intermixed with the solids is not reduced to an acceptable level, subsequent repetitions of this step can be conducted. With such subsequent extractions, the same or different supplementary organic solvent can be used, and the same or different operating parameters (e.g., temperature, pressure, flow rate, etc.) can be used. Any supplementary organic solvent remaining intermixed with the solids can be separated therefrom using conventional procedures (e.g., steam stripping, flashing, drying, etc.). The solids are then removed from the extraction unit.

In one embodiment of the invention, the following process steps are conducted prior to step (A). The feed composition, which is optionally mixed with an auxiliary organic solvent, is heated to a sufficiently high temperature to vaporize water that is intermixed therewith. The vaporized water is then separated from the feed composition. The amount of auxiliary organic solvent, if any, that is added is dependent upon the characteristics of the feed composition being treated, it being preferred that the feed composition or mixture of feed composition and auxiliary organic solvent have a sufficiently low viscosity during heating so that excessive bumping or foaming of the feed does not occur. In one embodiment of the invention, the weight ratio auxiliary organic solvent to feed composition is in the range of up to about 10:1, more preferably up to about 5:1, more preferably up to about 2:1, more preferably about 1:1. The auxiliary organic solvent preferably has the same characteristics as the first organic solvent discussed above, and can be the same as such first organic solvent. This procedure is particularly useful when the feed composition contains free water. In this regard, feed compositions having a free-water content in excess of about 5%, 10%, 20% and greater can be treated in accordance with this procedure. When this process step is used it is preferred to separate out at least about 20%, more preferably at least about 50%, more preferably at least about 90%, more preferably all or substantially all of the free water in the feed composition being treated; optionally, part or all of the remaining water (i.e., not free water) remaining in such feed composition can also be separated out. It is preferable that the auxiliary organic solvent has an initial boiling point above the boiling point of water, although solvents can be used wherein at least about 50% by weight, more preferably at least about 70% by weight, more preferably at least about 90% by weight of such solvent, boil at a temperature in excess of the boiling point of water. Heat may be supplied directly through steam coils or by the introduction of live steam into the mixture. Heat may also be supplied through external heating of the solvent or by recycling the solvent through a heat exchanger. Alternative methods of dehydration such as direct steaming, hot-air drying, etc., can be used. During and/or after vaporization of the water, the mixture that forms by the dissolution of extracted organic material in the auxiliary organic solvent can be removed from the solids using conventional mechanical separation techniques such as decanting, settling, filtration, centrifugation, etc.

The treated product produced in accordance with the inventive process comprises primarily the solids from the original feed composition. If the pretreatment and/or vaporization steps discussed above are used, the resulting treated product is a de-watered or relatively dry solids product. If the water was not previously removed from the solids and removal is desired, such water can be removed by any conventional means such as filtration, centrifugation, etc. The solids can be disposed of using conventional solids disposal techniques.

In the event undesirable metals or metal compounds are intermixed with the treated product solids produced in accordance with the inventive method, such solids can be treated with one or more fixation chemicals to immobilize the metal or metal compound sufficiently to thereby prevent or reduce to acceptable levels subsequent leaching of the metal or metal compound from the solids. The solids can be treated with one or more fixation chemicals by mixing the solids with the fixation chemical in water at ambient temperatures. The resulting slurry can then be de-watered using conventional techniques (e.g., filtration, centrifugation, settling, etc.). Various fixation chemicals that are commercially available are useful with the inventive process. Examples of such useful fixation chemicals include commercially available silica- or silicate-bearing solutions, fly ash and sodium sulfide. Pozzalime, a product of Mineral By-Products, Inc. identified as containing about 60% CaO and 16% $SiO_2$, is a commercially available fixation chemical that is useful. The fixation chemical is typically blended with the solids at levels of up to about 100% by weight based on the weight of said solids, preferably from about 10 to about 50% by weight based on the weight of said solids.

In order to further describe the inventive process, reference is made to FIGS. 1–4 wherein various illustrated embodiments of the inventive process are disclosed. With the exception of the embodiment disclosed in FIG. 4, any of the feed compositions discussed above can be treated with each of the illustrated embodiments. FIG. 4 relates to the treatment of refinery sludge. The solvents, operating parameters and procedures, and apparatus discussed above are applicable to these illustrated embodiments. In each of the drawings, Solvent No. 1 corresponds to the first organic solvent discussed above, and Solvent No. 2 corresponds to the second organic solvent.

FIG. 1 is a flow sheet illustrating a batch process for separating extractable organic material from a feed composition comprising said extractable organic material intermixed with solids and water. The process uses a pretreatment system, solvent extraction vessel and solvent-extract processing system. The feed composition is conveyed to the pretreatment system wherein part of the water and organic liquid (e.g., oil) is separated out from the feed composition. The pretreated feed composition is then conveyed to the solvent extraction vessel. The extraction vessel has a solvent inlet and an extract outlet and is preferably equipped with agitation means (e.g., non-static mixer, simple mixer, recirculating pump, etc.) to mix the vessel contents during solvent extraction. Agitation is optional, but preferable, and when used can be used on a continuous or intermittent basis. Solvent No. 1 and Solvent No. 2 are mixed and then advanced through the extraction vessel in contact with the feed composition. The flow of solvent through the solids dissolves the extractable organic materials that are intermixed with the solids and displaces the resulting mixture to and through the extract outlet. The solvent-extract effluent which comprises a mixture of separated extracted organic material and solvent, is advanced to the solvent-extract processing system wherein it is disposed of using conventional procedures or, for example, in the treatment of a refinery sludge, returned to an appropriate location in the refinery system (e.g., the crude tower) for further processing. If the concentration level of extractable organic material in the solvent-extract effluent is relatively low, the effluent can optionally be recycled. Solvent is continually circulated through the extraction vessel and solvent-extract is continually removed until all or substantially all of the extractable organic materials intermixed with the solids are completely removed, or their concentration is reduced to acceptable levels. The resulting treated product remaining in the extraction vessel comprises the solids and most of the water that was intermixed with the pretreated solids at the beginning of the solvent-extraction stage of the process. This water can be separated from the solids using conventional techniques (e.g., filtration, centrifugation, settling, etc.). The solvent remaining intermixed with the solids is separated from the solids by any of a number of conventional techniques including displacing the solvent with water or an inert gas, drying the solids, etc. If the concentration of Solvent No. 1 remaining intermixed with the solids is at an unacceptably high level, Solvent No. 2 can be circulated through the solids until a sufficient quantity of Solvent No. 1 is removed. Any Solvent No. 2 remaining intermixed with the solids can be separated from such solids using conventional techniques including displacement with water or an inert gas, drying the solids, etc. The solids are then disposed of using conventional solids disposal techniques (e.g., landfill, etc.).

Figure 2:
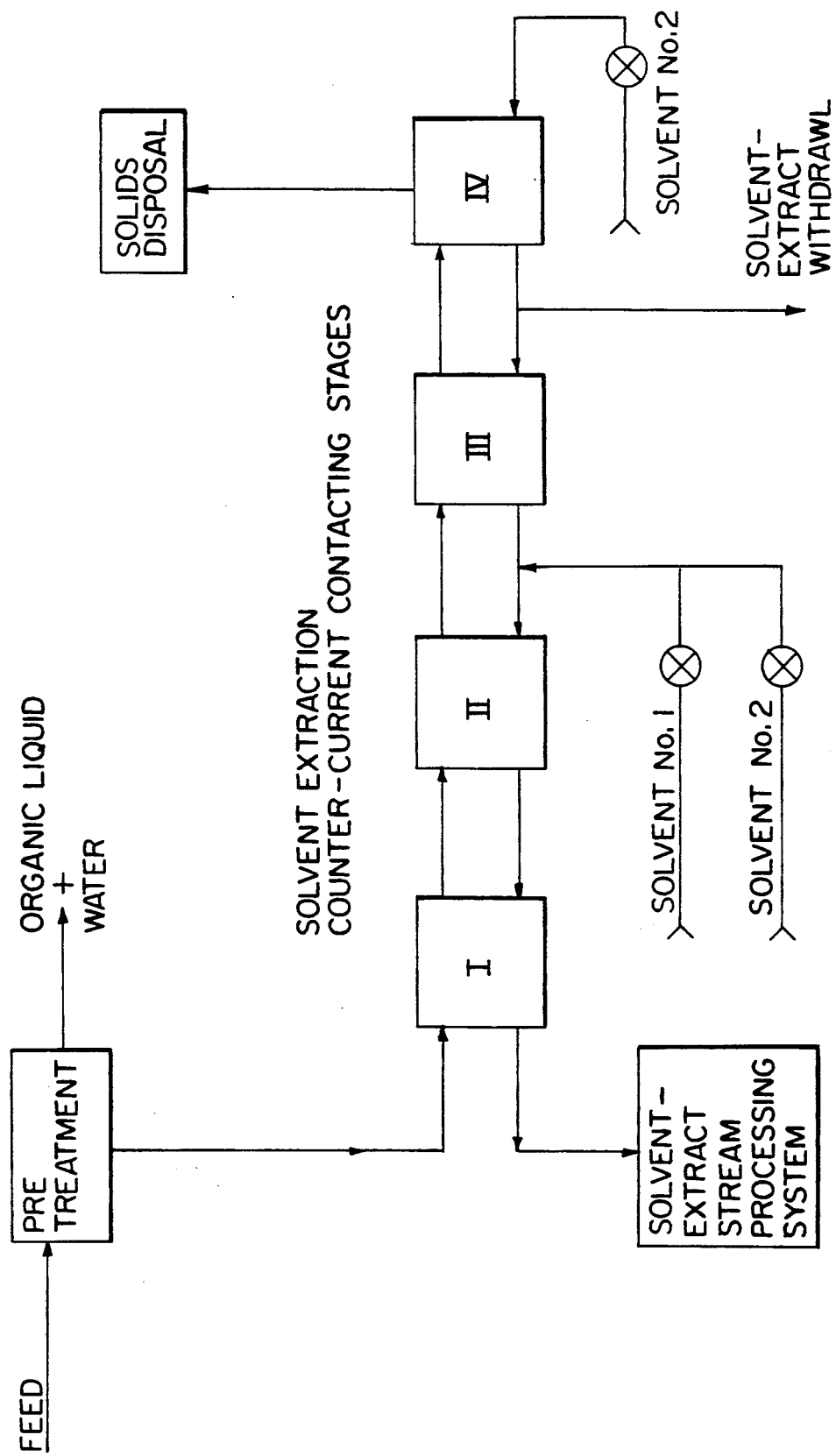
FIG. 2 is a flow sheet illustrating another embodiment of the invention wherein a counter-current process is used to separate extractable organic material from a feed composition comprising said extractable organic material intermixed with solids and water.

FIG. 2 is a flow sheet illustrating a counter-current process for separating extractable organic material from a feed composition comprising said extractable organic material intermixed with solids and water. The process uses a pretreatment system, solvent extraction unit and solvent-extract processing system. The feed composition is conveyed to the pretreatment system wherein part of the water and organic liquid (e.g., oil) is separated out from the feed composition. The pretreated feed composition is then conveyed to the solvent extraction unit. The solvent extraction unit consists of a series of four stages of interconnected mixer-settlers, labeled I–IV in FIG. 2. (It is to be understood that less than four or more than four mixer-settlers can be used depending upon the particular requirements for the desired extraction.) Feed composition from the pretreatment unit is advanced to stage I wherein it is contacted with solvent-extract from stage II. The contents of the mixer-settler in stage I are mixed for an effective period of time to provide the desired extraction and then permitted to settle. Solvent extract is removed from stage I and advanced to the solvent-extract stream processing system. The solids in stage I are conveyed from stage I to stage II. In stage II, the solids are mixed with the solvent mixture (i.e., mixture of Solvent No. 1 and Solvent No. 2) for an effective period of time to provide the desired extraction and then permitted to settle. Solvent-extract from stage II is advanced to stage I. Solids from stage II are conveyed to stage III. In stage III, the solids are mixed with solvent-extract from stage IV for an effective period of time to provide the desired extraction and then permitted to settle. The solvent-extract from stage III is advanced to stage II. The solids from stage III are conveyed to stage IV. The solids in stage IV are mixed with solvent No. 2 for an effective period of time to provide the desired extraction and then permitted to settle. Solvent-extract from stage IV is advanced to stage III. Optionally, part of the solvent-extract from stage IV can be withdrawn from the system. The solids from stage IV are conveyed to a suitable location for disposal. The solvent-extract effluent from stage I, which comprises a mixture of separated extracted organic material and solvent, is advanced to the solvent extract processing system wherein it is disposed of using conventional procedures or, for example, in the treatment of a refinery sludge, returned to a appropriate location in the refinery system for further processing. The solids from stage IV are intermixed with most of the water that was intermixed with the pretreated solids that were advanced to stage I from the pretreatment system. This water can be separated from the solids using conventional techniques (e.g., filtration, centrifugation, settling, etc.). Any solvent remaining intermixed with the solids conveyed from stage IV is separated from such solids by any of a number of conventional techniques including displacing the solid with water or an inert gas, drying the solids, etc.

Figure 3:
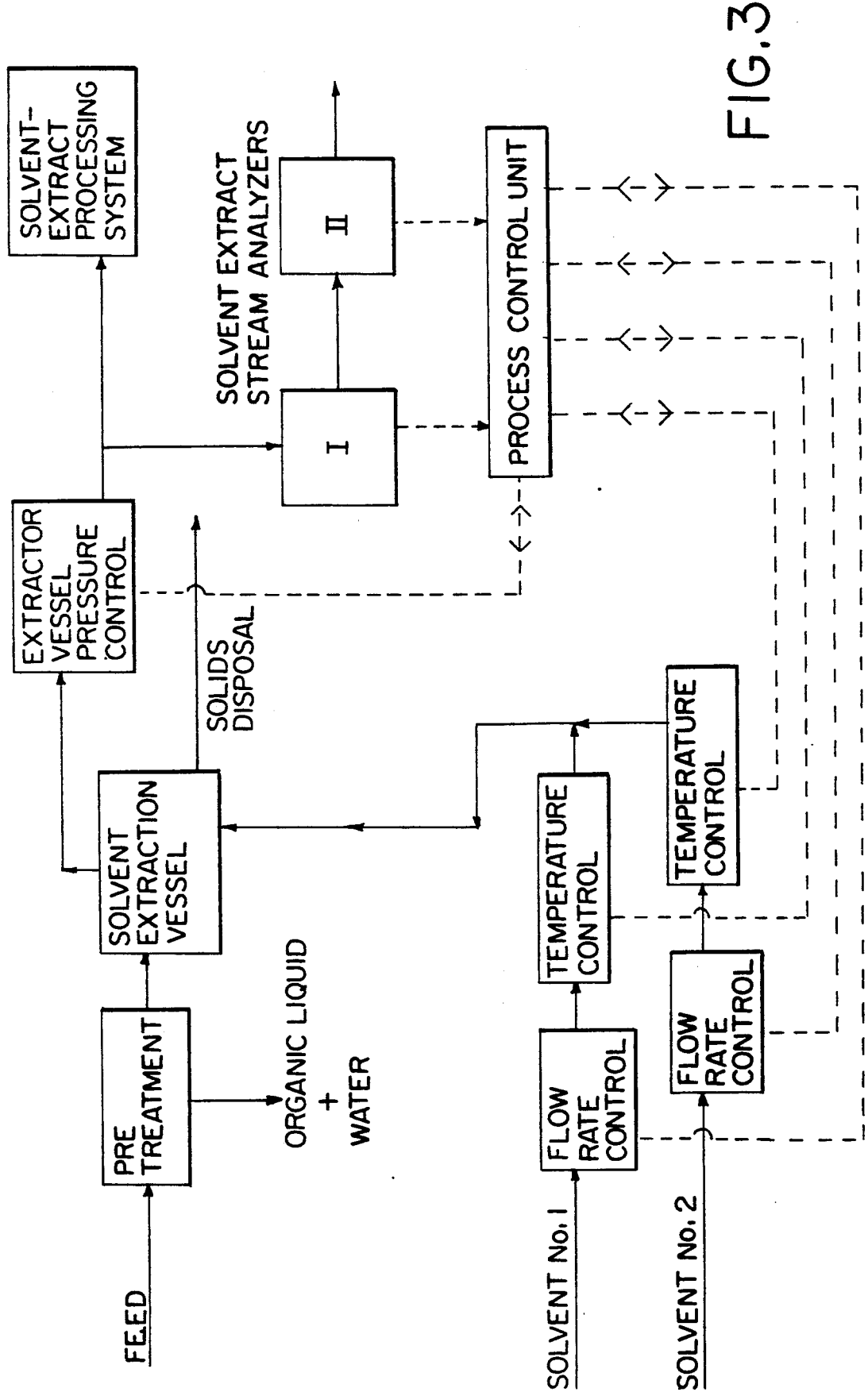
FIG. 3 is a flow sheet illustrating another embodiment of the invention wherein a control system is used for blending solvents in a solvent mixture that is used to separate extractable organic material from a feed composition comprising said extractable organic material intermixed with solids and water.

The process illustrated in FIG. 3 can be modified by replacing the mixer-settlers with a counter-current extraction column. An example of such a column would be a reciprocating-plate extraction column.

FIG. 3 is a flow sheet illustrating a batch process similar to the process illustrated in FIG. 1 with the exception that a control system is provided for blending the solvents in the solvent mixture. The pretreatment system, solvent extraction vessel, solvent-extract processing system and solids disposal techniques described above with respect to FIG. 1 are applicable to the system illustrated in FIG. 3. The process illustrated in FIG. 3 also includes flow rate and temperature control systems for Solvent No. 1 and Solvent No. 2, an extractor vessel pressure control system, and solvent extract stream analyzers. The process also includes a process control unit for monitoring and controlling each of the foregoing systems. The flow rate control systems for Solvent No. 1 and Solvent No. 2 are entirely conventional. An example of such a flow rate control system would include a mass flow meter for measuring flowrate in combination with a pump or remotely actuated valve for controlling flow rate. The temperature control systems for Solvent No. 1 and Solvent No. 2 are also entirely conventional. An example of such a temperature control system would include a thermocouple for measuring temperature in combination with a heating element or heat exchanger for changing the temperature. The extractor vessel pressure control is also entirely conventional. An example of such a pressure control system would include a back-pressure regulator. The solvent extract stream analyzers I and II are entirely conventional. An example of analyzer I would be a diode array spectrophotometer which monitors transmission of light at multiple wave lengths through a transparent flow cell through which the solvent-extract stream flows. An example of analyzer II would be a fluorometer which monitors fluorescence of the solvent-extract stream excited by UV irradiation while flowing through a transparent fluorescence cell. The process control unit receives output from the analyzers I and II and communicates with the flow rate control systems for Solvent No. 1 and Solvent No. 2 to provide an appropriate mixture of such solvents. The information from analyzers I and II is also used to control the inlet temperatures for Solvent No. 1 and Solvent No. 2 and the pressure of the solvent extraction vessel. The process control unit can be a microprocessor or a computer. The pathways providing for the flow of communication between the flow rate control systems, temperature control systems, pressure control system and analyzers I and II to and from the process control unit can be comprised of wires carrying analog or digital electrical signals, fiber optics carrying light signals, or tubing carrying hydraulic or pneumatic signals. The process control unit can be replaced by human operators reading displays and adjusting manual controls. A combination of the foregoing can be used.

FIG. 4 is a flow sheet illustrating a refinery system for separating extractable organic materials and water from a refinery sludge. These sludges typically contain undesirable metals and/or metal compounds intermixed therewith. The refinery sludge is pumped to temporary storage tanks wherein filtration aids are optionally added and the mixture is homogenized. Filtration aids (e.g., sand, lime, diatomaceous earth, etc.) are preferably added at a level of up to about 5 parts by weight of filtration aid per part by weight of dry solids. The conditioned sludge is then subjected to mechanical deliquification (e.g., a recessed plate filter press, vacuum filter, etc.) to partially de-oil and de-water the sludge. This step of the process can be conducted at moderate temperatures (e.g., up to about 150° F.) and moderate filter press differential pressures (e.g., up to about 100 psig). The solids are filtered out and accumulated in the filter press, while the oil and water are separated from the filtrate. The recovered oil can be returned to the crude unit for processing while the filtrate water can be returned to the forebay of the API separator for further treatment. The solvent extraction unit is designed and operated in the same manner in which the extraction unit depicted in FIG. 1 is designed and operated. Alternatively, this refinery system could be adapted to use any of the extraction processes illustrated in FIGS. 2 or 3. The first organic solvent and the second organic solvent are supplied by process units in the refinery system. The effluents from the extraction unit are returned to the refinery system for further use and/or processing. Preferably, the extraction process is conducted until the level of extractable organic materials intermixed with the solids is reduced to a level of less than about 1% by weight based on the weight of the solids. The solids are advanced from the extraction unit to the fixation unit wherein they are slurried in water with one or more fixation chemicals (e.g., silica- or silicate-bearing solutions, fly ash, sodium sulfide, etc.) to fix the metals and/or metal compounds intermixed with the solids to such solids to prevent or reduce to acceptable levels subsequent leaching of the metals and metal compounds from the solids.

The following example is illustrative of the inventive process. Unless otherwise indicated, in the following example as well as throughout the entire specification and in the appended claims, all parts and percentages are by weight, and all temperatures are in degrees Fahrenheit.

EXAMPLE 1

A refinery oily waste is dewatered on a plate and frame filter press to produce a semi-solid agglomerate filter cake. The filter cake is placed in an extraction vessel equipped with a solvent inlet and an effluent outlet. A solvent mixture consisting of 45% by volume n-pentane with 55% by volume toluene flows through the extraction vessel in contact with the filter cake. The solvent inlet temperature is 250° F. The pressure within the extraction vessel is sufficient to maintain the solvent mixture in a liquid state. An on-line spectrometer monitors light absorbance of the extractor effluent stream at the light wavelengths of 700 and 900 nm. The light absorbance at 700 nm is correlated with the quantity of extracted organic materials in the extractor effluent, and the absorbance at 900 nm is correlated with the absence or presence of flocculated asphaltenes in the effluent. The temperature of the extractor effluent increases to a temperature of 250° F. When the light absorbance at 700 nm indicates that the concentration of extracted organic materials in the effluent stream decreases to a predetermined value (indicating that the desired extent of extraction has been reached), the solvent inlet temperature is decreased to ambient temperature. At this point, reduction in the proportion of toluene in the solvent mixture is commenced. If the light absorbance at 900 nm indicates flocculated asphaltenes in excess of a predetermined level, the toluene concentration in the solvent mixture is temporarily increased. The proportion of toluene in the solvent mixture is gradually reduced to zero. The flow of n-pentane through the filter cake is continued until the toluene concentration in the filter cake is reduced to a desired level. The flow of n-pentane is stopped. The n-pentane remaining in the extractor vessel is drained, and residual n-pentane in the filter cake is evaporated using warm water.

An advantage of this invention is that an efficient, economical and reliable process is provided for treating solid and hazardous wastes such as refinery sludges, production sludges, etc., to render the product solids from this process delistable and/or to facilitate additional handling and treatment of the solids, e.g., treatment by fixation to prevent metal leaching. An additional advantage is that this process is adaptable to treating other compositions wherein extractable organic materials are intermixed with solids and water.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for separating extractable organic material from a feed composition comprising said extractable organic material intermixed with solids and water, the process comprising:
   (A) contacting said feed composition with a solvent mixture in an enclosed space, said solvent mixture comprising at least one first organic solvent and at least one second organic solvent, said first organic solvent dissolving at least about ten parts of said extractable organic material per million parts of said first organic solvent at the temperature wherein at least about 50% by weight of said first organic solvent boils at atmospheric pressure, said second organic solvent being different from and more volatile than said first organic solvent and dissolving at least about ten parts of said first organic solvent per million parts of said second organic solvent at the temperature wherein at least about 50% by weight of said second organic solvent boils at atmospheric pressure;
   (B) dissolving at least part of said extractable organic material in said solvent mixture to form a solvent-extract mixture; and
   (C) separating at least part of said solvent-extract mixture from the contents of said enclosed space, the remaining contents in said enclosed space comprising a treated product.

2. The process of claim 1 wherein, prior to step (A), said process further comprises contacting said feed composition with an auxiliary organic solvent, dissolving at least part of said extractable organic material in said auxiliary organic solvent to form an auxiliary solvent-extract mixture, and separating said auxiliary solvent-extract mixture from said feed composition, said auxiliary organic solvent dissolving at least about ten parts of said extractable organic material per million parts of said auxiliary organic solvent at the temperature wherein at least about 50% by weight of said auxiliary organic solvent boils at atmospheric pressure.

3. The process of claim 2 wherein said first organic solvent and said auxiliary organic solvent are the same.

4. The process of claim 1 wherein said treated product from step (C) comprises at least part of said first organic solvent, said process including the additional steps of contacting said treated product with a supplementary organic solvent, dissolving at least part of said first organic solvent in said supplementary organic solvent to form a supplementary solvent-first solvent mixture, and separating said supplementary solvent-first solvent mixture from said treated product, said supplementary organic solvent being more volatile than said first organic solvent and being capable of dissolving at least about ten parts of said first organic solvent per million parts of said supplementary organic solvent at the temperature wherein at least about 50% by weight of said supplementary organic solvent boils at atmospheric pressure.

5. The process of claim 4 wherein said second organic solvent and said supplementary organic solvent are the same.

6. The process of claim 1 wherein, prior to step (A), said process further comprises heating said feed composition at a sufficient temperature for an effective period of time to vaporize at least part of the water in said feed composition, and separating said vaporized water from said feed composition.

7. The process of claim 1 wherein, prior to step (A), said process further comprises mixing at least part of said feed composition with an auxiliary organic solvent, vaporizing at least part of the water in said feed composition, and separating said vaporized water from said feed composition, the boiling point of at least about 50% by weight of said auxiliary organic solvent being in excess of the boiling point in water, said auxiliary organic solvent dissolving at least about ten parts of said extractable organic material per million parts of said auxiliary organic solvent at the temperature wherein at least about 50% by weight of said auxiliary organic solvent boils at atmospheric pressure.

8. The process according to claim 7 wherein said first organic solvent and said auxiliary organic solvent are the same.

9. The process of claim 1 wherein said feed composition comprises free water, said process including, prior to step (A), the additional steps of mixing at least part of said feed composition with an auxiliary organic solvent, vaporizing all or substantially all of said free water, and separating said vaporized water from said feed composition, and boiling point of at least about 50% by weight of said auxiliary organic solvent being in excess of the boiling point of water, said auxiliary organic solvent being capable of dissolving at least about ten parts of said extractable organic material per million parts of said auxiliary organic solvent at the temperature wherein at least about 50% by weight of said auxiliary organic solvent boils at atmospheric pressure.

10. The process of claim 9 wherein said first organic solvent and said auxiliary organic solvent are the same.

11. The process of claim 1 wherein at least part of said extractable organic material is present in said treated product, said process further comprising the additional steps of:
contacting said treated product from step (C) with a supplementary solvent mixture, said supplementary solvent mixture comprising at least one supplementary first organic solvent and at least one supplementary second organic solvent, said supplementary first organic solvent dissolving at least about ten parts of said extractable organic material per million parts of said supplementary first organic solvent at the temperature wherein at least about 50% by weight of said supplementary first organic solvent boils at atmospheric pressure, said supplementary second organic solvent being different from and more volatile than said supplementary first organic solvent and dissolving at least about ten parts of said supplementary first organic solvent per million parts of said supplementary second organic solvent at the temperature wherein at least about 50% by weight of said supplementary second organic solvent boils at atmospheric pressure;
dissolving at least part of said extractable organic material in said supplementary solvent mixture to form a supplementary solvent-extract mixture; and
separating said supplementary solvent-extract mixture from said treated product.

12. The process of claim 11 wherein said supplementary solvent mixture is the same as said solvent mixture.

13. The process of claim 11 wherein said supplementary first organic solvent is the same as said first organic solvent.

14. The process of claim 11 wherein said supplementary second organic solvent is the same as said second organic solvent.

15. The process of claim 1 wherein said treated product comprises solids intermixed with water, said process including the step of separating at least part of said water from said solids.

16. The process of claim 1 wherein said treated product comprises at least one metal or metal compound intermixed with said solids, said process including the step of mixing an effective amount of at least one fixation chemical with said treated product to fix said metal or metal compound to said solids.

17. The process of claim 1 wherein step (A) is preceded by a step comprising separating at least part of said water from said feed composition.

18. The process of claim 1 wherein said feed composition comprises at least one organic liquid, said process including the step of separating at least part of said organic liquid from said feed composition prior to step (A).

19. The process of claim 1 wherein the process further comprises a step comprising recycling at least part of said solvent-extract mixture separated during step (C) into contact with said feed composition.

20. The process of claim 1 wherein said feed composition comprises solid waste.

21. The process of claim 1 wherein said feed composition comprises hazardous waste.

22. The process of claim 1 wherein said feed composition comprises petroleum waste.

23. The process of claim 1 wherein said feed composition comprises refinery sludge.

24. The process of claim 1 wherein said feed composition comprises production sludge.

25. The process of claim 1 wherein said solids are porous solids.

26. The process of claim 1 wherein said solids comprise liquid-filled, porous solids.

27. The process of claim 1 wherein said feed composition comprises:
(i) up to about 98% by weight water;
(ii) up to about 98% by weight inorganic solids;
(iii) up to about 98% by weight organic solids;
(iv) up to about 98% by weight organic liquid;
(v) up to about 98% by weight metals and/or metal compounds; and
(vi) up to about 98% by weight four- and/or five-ring polynuclear aromatic compounds.

28. The process of claim 1 wherein said first organic solvent comprises at least one aromatic compound, cycloaliphatic compound, aliphatic-substituted aromatic compound, cycloaliphatic-substituted aromatic compound, aliphatic-substituted cycloaliphatic compound, or mixture of two or more thereof.

29. The process of claim 1 wherein said first organic solvent comprises an aromatic-rich solvent.

30. The process of claim 1 wherein said first organic solvent comprises benzene, toluene, xylene, naphthalene, kerosene, fuel oil, or a mixture of two or more thereof.

31. The process of claim 1 wherein said first organic solvent comprises at least a light reformate.

32. The process of claim 1 wherein said first organic solvent comprises at least one heavy reformate.

33. The process of claim 1 wherein said first organic solvent comprises at least one natural gas condensate comprising hydrocarbons of about 7 to about 12 carbon atoms and having an aromatic and/or naphthalene content of about 40% to about 90% by weight.

34. The process of claim 1 wherein at least about 50% by weight of said first organic solvent boils at a temperature below about 750° F. at atmospheric pressure.

35. The process of claim 1 wherein said first organic solvent has an initial boiling point in the range of about 0° F. to about 500° F. at atmospheric pressure, and a final boiling point in the range of about 200° F. to about 1000° F. at atmospheric pressure.

36. The process of claim 1 wherein said first organic solvent has an initial boiling point in the range of about 50° F. to about 150° F. at atmospheric pressure, and a final boiling point in the range of about 200° F. to about 300° F. at atmospheric pressure.

37. The process of claim 1 wherein said first organic solvent has an initial boiling point in the range of about 300° F. to about 500° F., and a final boiling point in the range of about 650° F. to about 850° F.

38. The process of claim 1 wherein said first organic solvent has an initial boiling point in the range of about 180° F. to about 280° F., and a final boiling point in the range of about 325° F. to about 425° F.

39. The process of claim 1 wherein said first organic solvent has an initial boiling point in the range of about 200° F. to about 325° F., and a final boiling point in the range of about 425° F. to about 525° F.

40. The process of claim 1 wherein said second organic solvent is an aliphatic, aromatic and/or cycloaliphatic hydrocarbon of from 2 to about 9 carbon atoms, or is a halohydrocarbon of from 1 to about 9 carbon atoms, or is a mixture of two or more thereof.

41. The process of claim 1 wherein said second organic solvent has from about 3 to about 5 carbon atoms.

42. The process of claim 1 wherein said second organic solvent has from about 5 to about 7 carbon atoms.

43. The process of claim 1 wherein said second organic solvent is selected from the group consisting of propane, cyclopropane, propylene, n-butane, isobutane, cyclobutane, butene, butadiene, isobutylene, n-pentane, isopentane, neopentane, cyclopentane, pentene, cyclopentene, pentadiene, cyclopentadiene, cyclohexane, cyclohexene, cyclohexadiene, methylene chloride, dichlorodifluoromethane, trichlorofluoromethane, chloroethane, trichloroethane, dichlorotetrafluoroethane, trichloroethylene, tetrafluoroethylene, chloropropane, chlorobutane, chloropentane, dichloropentane, and mixtures of two or more thereof.

44. The process of claim 1 wherein said second organic solvent comprises propane.

45. The process of claim 1 wherein said second organic solvent comprises pentane.

46. The process of claim 1 wherein said second organic solvent comprises benzene, toluene and/or xylene.

47. The process of claim 1 wherein said second organic solvent comprises gas well condensate comprising hydrocarbons of from about 5 to about 7 carbon atoms.

48. The process of claim 1 wherein said second organic solvent comprises liquefied petroleum gas, gas well condensate, straight run gasoline, or a mixture of two or more thereof.

49. The process of claim 1 wherein at least about 30% by weight of said solvent mixture is in a condensed state during steps (A) and (B).

50. The process of claim 1 wherein said solvent mixture is at a temperature in the range of about 0° F. to about 800° F. during steps (A) and (B).

51. The process of claim 1 wherein the average contact time between said solvent mixture and the solids in said feed composition during steps (A) and (B) is from about 0.01 minutes to about 100 hours.

52. The process of claim 1 wherein mechanical means are provided to mix said feed composition with said solvent mixture during steps (A) and (B).

53. The process of claim 1 wherein the weight ratio of said first organic solvent to said second organic solvent during steps (A) and (B) is from about 95:5 to about 5:95.

54. The process of claim 1 wherein said solvent mixture has a single parameter solubility parameter within about ±2 (cal./ml.)$^{\frac{1}{2}}$ at 70° F. of the single parameter solubility parameter at 70° F. of said extractable organic material.

55. The process of claim 1 wherein the difference between the two-parameter solubility parameters for said solvent mixture and the two-parameter solubility parameters for said extractable organic material is up to about 3 (cal./ml.)$^{\frac{1}{2}}$ at 70° F.

56. The process of claim 1 wherein the process is operated on a batch basis.

57. The process of claim 1 wherein the process is operated on a continuous basis.

58. A process for separating extractable organic material from a feed composition comprising said extractable organic material intermixed with solids and water, the process comprising:

(A) contacting said feed composition with a solvent mixture in an enclosed space, said solvent mixture having a single parameter solubility parameter within about ±2 (cal./ml.)$^{\frac{1}{2}}$ at 70° F. of the single parameter solubility parameter of said extractable organic material at 70° F. and comprising at least one first organic solvent and at least one second organic solvent, said first organic solvent having a higher single parameter solubility parameter than said second organic solvent, said second organic solvent being more volatile than said first organic solvent, said second organic solvent dissolving at least about ten parts of said first organic solvent per million parts of said second organic solvent at the temperature wherein at least about 50% by weight of said second organic solvent boils at atmospheric pressure;

(B) dissolving at least part of said extractable organic material in said solvent mixture to form a solvent-extract mixture; and (C) separating at least part of said solvent-extract mixture from the contents of said enclosed space, the remaining contents in said enclosed spaced comprising a treated product.

59. A process for separating extractable organic material from a feed composition comprising said extractable organic material intermixed with solids and water, the process comprising:

(A) contacting said feed composition with a solvent mixture in an enclosed space, said solvent mixture having a single parameter solubility parameter in the range of about 6 to about 13 (cal./ml.)$^{\frac{1}{2}}$ at 70° F. and comprising at least one first organic solvent and at least one second organic solvent, said first organic solvent having a single parameter solubility parameter that is higher than the single parameter solubility parameter of said second organic solvent, said single parameter solubility parameter of said first organic solvent being in the range of about 7 to about 14 (cal./ml.)$^{\frac{1}{2}}$ at 70° F., said second organic solvent being more volatile than said first organic solvent and having a single parameter solubility parameter in the range of about 5.5 to about 8.5 (cal./mg.)$^{\frac{1}{2}}$ at 70° F., said second organic solvent dissolving at least about ten parts of said first organic solvent per million parts of said second organic solvent at the temperature wherein at least about 50% by weight of said second organic solvent boils at atmospheric pressure;

(B) dissolving at least part of said extractable organic material in said solvent mixture to form a solvent-extract mixture; and (C) separating at least part of said solvent-extract mixture from the contents of said enclosed space, the remaining contents in said enclosed space comprising a treated product.

60. A process for separating extractable organic material from a feed composition comprising said extractable organic material intermixed with solids and water, the process comprising:

(A) contacting said feed composition with a solvent mixture in an enclosed space, said solvent mixture comprising toluene and at least one pentane, said pentane dissolving at least about ten parts of said toluene per million parts of said pentane at the temperature wherein at least about 50% by weight of said pentane boils at atmospheric pressure;

(B) dissolving at least part of said extractable organic material in said solvent mixture to form a solvent-extract mixture; and (C) separating at least part of said solvent-extract mixture from the contents of said enclosed space, the remaining contents in said enclosed space comprising a treated product.

61. A process for separating extractable organic material from a feed composition comprising said extractable organic material intermixed with solids, water and one or more metals or metal compounds, the process comprising the steps of:

(A) removing at least part of said water from said feed composition;

(B) separating extractable organic material from said feed composition by the steps of:

(A) contacting said feed composition with a solvent mixture in an enclosed space, said solvent mixture comprising at least one first organic solvent and at least one second organic solvent, said first organic solvent dissolving at least about ten parts of said extractable organic material per million parts of said first organic solvent at the temperature wherein at least about 50% by weight of said first organic solvent boils at atmospheric pressure, said second organic solvent being different from and more volatile than said first organic solvent and dissolving at least about ten parts of said first organic solvent per million parts of said second organic solvent at the temperature wherein at least about 50% by weight of said second organic solvent boils at atmospheric pressure;

(B) dissolving at least part of said extractable organic material in said solvent mixture to form a solvent-extract mixture; and (C) separating at least part of said solvent-extract mixture from the contents of said enclosed space, the remaining contents in said enclosed space comprising a treated product; and (III) contacting said treated product with an effective amount of one or more fixation chemicals to fix said metal and/or metal compound to said solids.

* * * * *